US010392994B2

(12) United States Patent
Heichelbech et al.

(10) Patent No.: US 10,392,994 B2
(45) Date of Patent: Aug. 27, 2019

(54) REDUCTANT INJECTION EXHAUST MANIFOLD

(71) Applicant: Cummins, Inc., Columbus, IN (US)

(72) Inventors: John K. Heichelbech, Columbus, IN (US); John G. Buechler, Indianapolis, IN (US); Richard J. Ancimer, Toronto (CA); Thomas M. Yonushonis, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 155 days.

(21) Appl. No.: 15/525,540

(22) PCT Filed: Dec. 2, 2015

(86) PCT No.: PCT/US2015/063375
§ 371 (c)(1),
(2) Date: May 9, 2017

(87) PCT Pub. No.: WO2016/089963
PCT Pub. Date: Jun. 9, 2016

(65) Prior Publication Data
US 2017/0370263 A1 Dec. 28, 2017

Related U.S. Application Data

(60) Provisional application No. 62/087,881, filed on Dec. 5, 2014.

(51) Int. Cl.
*F01N 3/20* (2006.01)
*F01N 3/28* (2006.01)

(52) U.S. Cl.
CPC .......... *F01N 3/2892* (2013.01); *F01N 3/208* (2013.01); *F01N 3/2066* (2013.01);
(Continued)

(58) Field of Classification Search
CPC ...... F01N 3/208; F01N 3/2066; F01N 3/2892; F01N 2610/02; F01N 2610/1453
See application file for complete search history.

(56) References Cited

U.S. PATENT DOCUMENTS 4,069,672 A 1/1978 Milling
7,485,272 B2 * 2/2009 Driscoll ................ B01D 53/90 423/213.2

(Continued)

FOREIGN PATENT DOCUMENTS

DE 102011105049 A1 * 12/2012 ............ F01N 3/206
EP 2 280 155 B1 3/2014

OTHER PUBLICATIONS

Machine translation of DE-102011105049-A1, accessed Mar. 15, 2019. (Year: 2019).*

(Continued)

*Primary Examiner* — Jonathan R Matthias
(74) *Attorney, Agent, or Firm* — Foley & Lardner LLP

(57) ABSTRACT

An aftertreatment system comprises a first passageway having a first temperature and a second passageway having a second temperature different than the first temperature. A turbine is disposed downstream from the first passageway and upstream from the second passageway. The turbine is in fluidic communication with the first passageway and the second passageway. The turbine is structured to receive an exhaust gas from the first passageway, generate energy using the exhaust gas flowing through the turbine and communicate the exhaust gas to the second passageway. The aftertreatment system also includes an insertion device structured to insert an exhaust reductant into the first passageway. A selective catalytic reduction system is configured to receive the exhaust gas from the second passageway and treat the exhaust gas. The first temperature can be higher than the second temperature.

10 Claims, 4 Drawing Sheets

(52) U.S. Cl.
CPC ...... *F01N 2340/06* (2013.01); *F01N 2610/02* (2013.01); *Y02T 10/24* (2013.01)

(56) References Cited

U.S. PATENT DOCUMENTS

| | | | | |
|---|---|---|---|---|
| 2006/0127694 | A1 | 6/2006 | Hazel et al. | |
| 2008/0034739 | A1* | 2/2008 | Ranalli ............. | B01D 53/8653 60/295 |
| 2011/0113759 | A1 | 5/2011 | Tilinski et al. | |
| 2011/0131957 | A1 | 6/2011 | Hepburn et al. | |
| 2012/0216529 | A1 | 8/2012 | Joshi et al. | |
| 2013/0291841 | A1 | 11/2013 | Fukuyama et al. | |

OTHER PUBLICATIONS

International Search Report and Written Opinion issued for PCT/US2015/063375, dated Feb. 9, 2016, 18 pages.

* cited by examiner

REDUCTANT INJECTION EXHAUST MANIFOLD

CROSS REFERENCE TO RELATED APPLICATIONS

This application is a National Stage of PCT Application No. PCT/US2015/063375, filed Dec. 2, 2015, which claims priority and benefit of U.S. Provisional Patent Application No. 62/087,881, filed Dec. 5, 2014 and entitled "Reductant Injection in Exhaust Manifold." The contents of both applications are herein incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of regulated exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Generally in such conventional aftertreatment systems, an exhaust reductant (e.g., a diesel exhaust fluid such as urea) is injected into the aftertreatment system to provide a source of ammonia and to mix with the exhaust gas. When the exhaust reductant is in the form of a urea based solution, the reductant that can react with the NOx over the catalyst is formed through a complex processes (involving evaporation, thermolysis, decomposition). These processes are endothermic and generally require sufficient temperature (>200 degrees C.) to achieve a good yield. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

Some aftertreatment systems can also include a turbine disposed in a flow path of the exhaust gas. The turbine can be a part of a turbocharging system that extracts energy from the exhaust gas flowing through the turbine to operate an associated compressor. The exhaust reductant is generally injected into the exhaust flow after the exhaust gas has passed through the turbine.

If the exhaust reductant is injected into an environment of relatively low temperature (<200 degrees C.), undesirable side effects can occur. For example, deposits associated with the exhaust reductant can form leading to less efficient mixing of the exhaust reductant and loss of control fidelity, both of which can adversely impact the NOx conversion efficiency of the aftertreatment system. Additionally, the creation of deposits can increase the exhaust backpressure on the IC engine, adversely impacting engine performance. Temperatures downstream of the turbine tend to be lower than that upstream of the turbine.

Furthermore, future emission legislation is expected to require higher NOx conversion efficiencies at lower exhaust gas temperatures. For example, as fuel economy standards become more stringent, the expectation is that there will be less waste heat available in the exhaust gas. At the same time, criteria pollutant standard are also being tightened. The combination leads to the need to have a system that enables high aftertreatment system effectiveness at low exhaust gas temperatures. However, the exhaust gas thermal energy of currently available technologies does not support low temperature dosing of aftertreatment systems with the exhaust reductant.

SUMMARY

Embodiments described herein relate generally to aftertreatment systems for use with IC engines and in particular, to aftertreatment systems that provide exhaust reductant dosing into the exhaust gas upstream of a turbine of a turbocharger system which is in fluidic communication with the aftertreatment system.

In a first set of embodiments, an aftertreatment system comprises a first passageway having a first temperature and a second passageway having a second temperature different than the first temperature. A turbine is disposed downstream from the first passageway and upstream from the second passageway. The turbine is in fluidic communication with the first passageway and the second passageway. The turbine is structured to receive an exhaust gas from the first passageway, generate energy using the exhaust gas flowing through the turbine and communicate the exhaust gas to the second passageway. The aftertreatment system also includes an insertion device structured to inject or otherwise insert an exhaust reductant into the first passageway. A SCR system is configured to receive the exhaust gas from the second passageway and treat the exhaust gas. In particular embodiments, the first temperature is higher than the second temperature.

In another set of embodiments, an aftertreatment system comprises a turbine and a selective catalytic reduction system positioned downstream of the turbine. An exhaust gas loop is structured to receive an exhaust gas and comprises a first branch fluidly coupled to the turbine. The first branch is structured to communicate a first portion of the exhaust gas into the turbine. The exhaust gas loop also comprises a second branch structured to communicate a second portion of the exhaust gas to a part of the exhaust gas loop downstream of the turbine. The second branch bypasses the turbine so that the second portion of the exhaust gas does not flow through the turbine. The first portion of the exhaust gas and the second portion of the exhaust gas combine downstream of the turbine. An insertion device is structured to insert the exhaust reductant into the second branch.

In yet another set of embodiments, an apparatus for minimizing exhaust reductant deposits in an aftertreatment system which comprises a first passageway, a second passageway, a turbine positioned downstream of the first passageway and upstream of the second passageway, and a selective catalytic reduction system positioned downstream of the second passageway. The apparatus comprises an insertion device structured to insert an exhaust reductant into the aftertreatment system. A valve is positioned downstream of the insertion device. The valve is structured to selectively direct the flow of the exhaust reductant into one of the first passageway or the second passageway. The first passageway has a first temperature greater than a second temperature of the second passageway.

In still another set of embodiments, a method for reducing exhaust reductant deposits in an aftertreatment system which comprises a first passageway, a second passageway, a turbine positioned downstream of the first passageway and upstream of the second passageway, and a selective catalytic reduction system positioned downstream of the second passageway is provided. The method comprises flowing an exhaust gas through the aftertreatment system. A second temperature of the second passageway is determined. It is determined whether the second temperature is lower than a first temperature of the first passageway. In response to determining that the second temperature is lower than a minimum threshold, the exhasut reductant is inserted into the first passageway.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
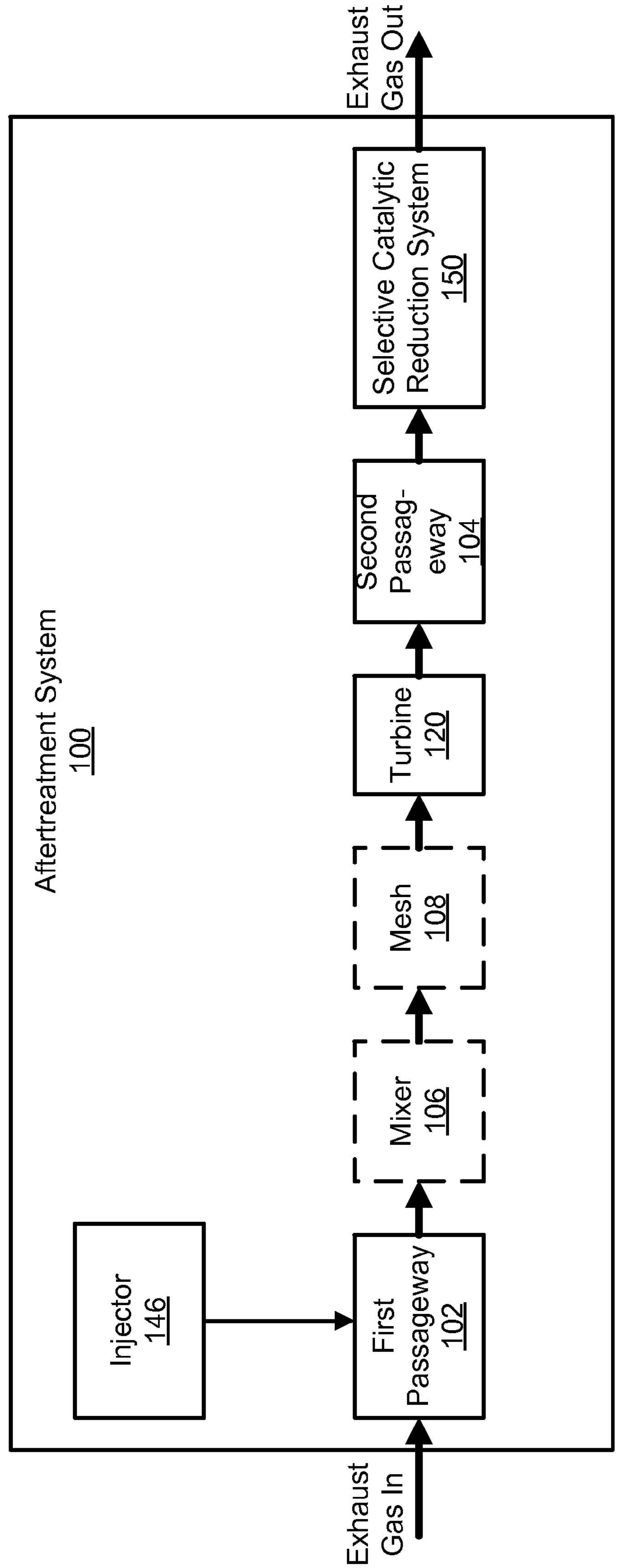
FIG. 1 is a schematic block diagram of an aftertreatment system, according to one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to aftertreatment systems for use with IC engines and, in particular, to aftertreatment systems that provide exhaust reductant dosing into the exhaust gas upstream of a turbine of a turbocharger system which is in fluidic communication with the aftertreatment system.

Embodiments described herein provide several benefits including, for example: (1) communicating exhaust reductant in an exhaust gas flow upstream of a turbine included in a turbo charger system where the exhaust gas temperature is higher; (2) reducing deposits and increasing NOx conversion efficiency at lower temperatures, for example, 50% weighting of the cold cycle; (3) including a screen to prevent any exhaust reductant deposits from entering the turbine; (4) coating the turbine and/or other components of the aftertreatment system to protect the turbine and/or components from corrosion by the exhaust reductant; (5) providing a valve to selectively direct at least a portion of the flow of the exhaust gas upstream or downstream of the turbine based on the temperature of a portion of the exhaust treatment system downstream of the turbine; and (6) redirecting a portion of the exhaust gas that includes the exhaust reductant to bypass the turbine such that the turbine does not come in contact with the exhaust gas and is protected against any corrosion.

FIG. 1 is a schematic diagram of an aftertreatment system 100 for treating an exhaust gas (e.g., diesel exhaust gas) produced by an engine (not shown). The aftertreatment system 100 includes a first passageway 102, a second passageway, 104, a turbine 120, an injector 146, and a SCR system 150.

The first passageway 102 is structured to receive an exhaust gas (e.g., a diesel exhaust gas) from an engine (e.g., a diesel engine). The first passageway 102 can be formed from any suitable material, for example, metals, alloys, ceramics, plastics, any other suitable material or a combination thereof. The first passageway 102 can have any suitable cross-section, for example, circular, rectangular, square, elliptical, or any other suitable cross-section. The first passageway 102 has a first temperature. The first temperature can be the same as the temperature of the exhaust gas when it is expelled from the engine.

The second passageway 104 is disposed downstream of the first passageway and has a second temperature. The second passageway 104 can be formed from any suitable material and can have any suitable cross-section as described with respect to the first passageway 102. The second passageway 104 has a second temperature which is different than the first temperature.

The turbine 120 is disposed downstream from the first passageway 102 and upstream of the second passageway 104. The turbine 120 is in fluidic communication with each of the first passageway 102 and the second passageway 104. The turbine 120 is structured to receive the exhaust gas from the first passageway 102, extract energy from the exhaust gas flowing through the turbine 120 and communicate the exhaust gas to the second passageway 104. The turbine 120 can be included in a turbocharger system configured to utilize at least a portion of the exhaust gas to extract energy which can be used, for example, to operate an associated compressor that compresses air entering the combustion chamber(s) of the engine.

The injector 146 is structured to inject or otherwise insert an exhaust reductant into the first passageway 102. The injector 146 can include a pump, valves, nozzles and any other components for injecting the exhaust reductant into the first passageway 102. In some embodiments, the exhaust gas can include a diesel exhaust gas and the exhaust reductant can include a diesel exhaust fluid. The diesel exhaust fluid can include urea, an aqueous solution of urea, or any other fluid that includes ammonia, by products, or any other diesel exhaust fluid as is known in the arts (e.g., the diesel exhaust fluid marketed under the name ADBLUE®).

It should be noted that, while an injector is specifically referenced herein, it is also possible to use other forms of insertion devices for inserting the reductant into a first passageway, a second passageway or any other location of an aftertreatment system. It should therefore be understood that any of the injectors discussed herein could be replaced with other types of reductant insertion devices.

As the exhaust gas flows from the first passageway 102 to the second passageway 104 via the turbine 120, the exhaust gas loses thermal energy such that the first temperature of first passageway 102 is greater than the second temperature of the second passageway 104. If the exhaust reductant is injected at the lower second temperature of the second passageway 104 the formation of deposits can be induced. The formation of the exhaust reductant based deposits can lead to lower NOx conversion efficiency and increased backpressure, as described herein. Conventional systems generally provide injection of the exhaust reductant downstream of the turbine, downstream of a diesel oxidation catalyst (DOC) or a diesel particulate filter (DPF).

In contrast, the injector 146 is structured to inject or otherwise insert the exhaust reductant into the first passageway 102 having the first temperature which is greater than the second temperature of the second passageway 104. The higher temperature enables higher yield through improved evaporation, thermolysis and decomposition of the exhaust reductant which can reduce formation of solids or crystals in the exhaust reductant, thereby reducing deposit, improving mixing of the exhaust reductant with the exhaust gas and increasing NOx conversion efficiency. Furthermore, the higher first temperature can also facilitate removal of any exhaust reductant deposits that form in the first passageway 102.

The SCR system 150 is disposed downstream of the second passageway 104. The SCR system 150 is configured to receive the exhaust gas from the second passageway 104 and reduce the exhaust gas with the assistance of the injected exhaust reductant. The SCR system 150 includes one or more catalysts formulated to selectively reduce the exhaust gas. Any suitable catalyst can be used such as, for example, iron, manganese, copper, vanadium based catalyst, zeolite based catalysts, any other suitable catalyst, or a combination thereof.

In particular embodiments, a screen 108 (e.g., a mesh, a net, a filter, etc.) can also be included in the aftertreatment system 100. The screen 108 can be disposed upstream of the turbine 120. The screen 108 can be structured to prevent any exhaust reductant deposits (e.g., large chunks of pieces of solidified exhaust reductant) form entering the turbine 120.

A mixer 106 can also be included in the aftertreatment system 100. The mixer can 106 can include any mechanical device or a catalyst structured to reduce a size of the droplets of the exhaust reductant flowing from the first passageway 102 into the turbine 120.

In another embodiment, the first passageway 102 can be disposed downstream of the engine producing the exhaust gas. For example, the first passageway 102 can form at least a portion of an exhaust manifold. The exhaust reductant can be injected in the first passageway 102 proximate to an outlet of the engine from which the exhaust gas is communicated into the first passageway 102 from the engine.

The first temperature at this location can be sufficiently high (e.g., above 200 degrees Celsius) such that the exhaust reductant is vaporized (e.g., via evaporation, thermolysis and/or decomposition). Furthermore, the engine can employ variable valve timing (VVT) to produce the exhaust gas at the first temperature which is sufficient for vaporizing the exhaust reductant. VVT can be used to produce an early exhaust event based on the demand of the aftertreatment system, for example, to generate heat for mitigating deposits. Such an exhaust event can be produced on demand based on the operational parameters of the engine and/or the aftertreatment system.

In still other embodiments, the aftertreatment system 100 can also include a diesel oxidation catalyst and/or a diesel particulate filter which can be disposed downstream of the SCR system 150. In particular embodiments, the SCR system 150 can include a SCR filter system. In other embodiments, the SCR system 150, the diesel particulate filter and/or the diesel oxidation catalyst can be close coupled.

In some embodiments, the exhaust reductant can be injected at multiple locations in the aftertreatment system. For example, the injector 146 can be configured to inject the exhaust reductant in the first passageway 102, in the second passageway 104, or in the turbine 120 based on operational parameters of the engine and/or the aftertreatment system 100.

Other approaches can also be used to maximize atomization of the exhaust reductant and minimize deposits. In some embodiments, the exhaust reductant can be used as a coolant for the engine and circulated in one or more cylinder heads of the engine. In this manner, the exhaust reductant can absorb heat from the engine and be heated before communicating to the first passageway 102.

In other embodiments, the exhaust reductant can be used as a coolant for an exhaust gas recirculation (EGR) system (not shown) such that the exhaust reductant absorbs heat from the exhaust gas flowing through the EGR system and is heated prior to injection.

In yet another embodiment, the exhaust reductant can be injected or otherwise inserted directly into a combustion chamber of the engine or immediately downstream of the combustion chamber. The energy of combustion can be used to vaporize the exhaust reductant and can enable efficient mixing of the exhaust reductant with the exhaust gas. In still other embodiments, a stem of an exhaust valve of the engine can be used as an injector. For example, the valve can include a hollow region through which the exhaust reductant can be injected into the exhaust gas flow.

In alternate embodiments, the exhaust reductant can be injected or otherwise inserted at the intake port of the cylinder. In such embodiments, the injector 146 can take the form of a cold start reductant injector. The exhaust reductant can be heated inside the cylinder and then delivered to the first passageway 102 or another location of the aftertreatment system 100 via VVT.

The higher temperature and/or pressure of the first passageway 102 can ensure that the exhaust reductant is sufficiently evaporated. This can ensure that the droplet size of the exhaust reductant is small enough to not damage the turbine 120. In some embodiments, flash atomization can be used to reduce the droplet size of the exhaust reductant. In other embodiments, the injector 146 can be a heated injector (e.g., include a heating element) configured to heat and vaporize the exhaust reductant. The vaporized exhaust reductant can be communicated into the first passageway 102, the second passageway 104, and/or any other location in the aftertreatment system 100 based on operational parameters of the engine and/or aftertreatment system 100.

In particular embodiments, the exhaust reductant can be communicated into the first passageway 102 or any other portion of the aftertreatment system 100 in pulses or otherwise fixed intervals (i.e., pulsating flow). The pulses of exhaust reductant flow can be timed with a frequency of the valve of the engine, for example, to synchronize exhaust reductant injection with the flow of the exhaust gas. Low pressure of the exhaust gas can provide more penetration of the exhaust reductant into the exhaust gas and better atomization. High pressure can provide higher flow which can shear the exhaust reductant droplets and thereby, reduce the size of the droplets. The pulsating flow of the exhaust reductant can be configured to inject the exhaust reductant at the optimum pressure to optimize the atomization, penetration of the exhaust reductant in the exhaust gas and flow rate for reducing the size of the exhaust reductant droplets.

In one embodiment, an exhaust manifold of the engine or the first passageway 102 can be structured to include a scooping side passage. The exhaust reductant can be injected in this portion and communicated to the bulk flow of the exhaust gas. This can provide more control of the exhaust reductant injection area.

In other embodiments, the injector 146 can include air assisted injectors configured to reduce or eliminate pulsation, and to provide the smallest droplet size. In such embodiments, a plenum can be disposed between the injector 146 and a nozzle through which the exhaust reductant is communicated into the first passageway 102. A damping or otherwise reduction of the exhaust gas pressure can occur in the plenum because of the air assisted injection which can provide performance improvement over a pulsing frequency of the injector 146 (e.g., about 1 Hz).

In some embodiments, surfaces of the turbine 120 and/or surfaces of other components of the aftertreatment system 100 (e.g., sensors disposed in the first passageway 102 and the second passageway 104) can be coated with a protective coating. The protective coating can be formulated to protect the turbine 120 and/or surface of the aftertreatment system 100 from corrosion caused by the exhaust reductant. For example, the coating can be formulated to prevent the surface of the turbine and/or the housing of the turbine from oxidation which can increase clearance between the turbine 120 and the turbine 120 housing. In other embodiments, the turbine and/or the components of the aftertreatment system 100 can be formed from materials which are resistant to corrosion by the exhaust reductant. Furthermore, different seals can be used to prevent wetting of the components by the exhaust reductant thereby preventing corrosion.

As described herein, the injector 146 can be heated or include heating elements to heat the exhaust reductant. In such embodiments, a coolant can be used to cool the injector 146. In one embodiment, the coolant can include engine coolant. For example, a portion of the engine coolant can be communicated from a cooling system fluidically coupled to the engine to the injector 146 to cool the injector. Such a coolant system can be formed from stainless steel.

As described herein, the injector 146 injects the exhaust reductant into the first passageway 102 which is at the first temperature. The injector 146 can be disposed on an outside surface of the first passageway 102. However, in such configurations, the injector 146 is exposed to the first temperature of the first passageway 102 which can be relatively high under certain IC engine operating conditions (e.g., greater than 350 degrees Celsius). This high temperature can be detrimental to the injector 146 and can melt the components of the injector 146 or otherwise degrade the performance of the injector 146. Furthermore, a nozzle or tip of the injector 146 can be formed from an inert and corrosion resistant material, for example, ceramics. In this manner, the injector 146 can be structured to withstand extremely high temperatures, for example, a temperature of greater than 350 degrees Celsius. In still other embodiments, first passageway 102 and/or the exhaust manifold can be insulated to maintain the first temperature within the first passageway 102 while still cooling the injector 146.

In other embodiments, the injector 146 can be provided with cooling or formed from materials structured to withstand the first temperature. In some embodiments, the exhaust reductant can be used as the coolant for cooling the injector 146. In other embodiments, shielding can be provided around the injector 146 to protect the injector 146 from the heat. Moreover insulators and/or mounting gaskets can be used to shield the injector 146 from the first temperature. In still other embodiments, one or more control actuators of the injector 146 can be remotely located. Such injectors 146 can include air assisted open nozzle injectors which use an injector upstream of the injector nozzle.

Mounting the injector 146 on the first passageway 102 places the injector 146 proximal to the engine. Thus the injector 146 can be exposed to engine and/or chassis vibrations which can impede the performance of the injector 146. To prevent any loss of performance, the injector 146 can be disposed remotely from the first passageway 102. This can add a delay between the actuation of the injector 146 and delivery of the exhaust reductant into the first passageway 102. Controllers can be used to compensate for the lag by actuating the injector 146 beforehand or otherwise time the actuation of the injector 146 such that the lag is accounted for.

Figure 2:
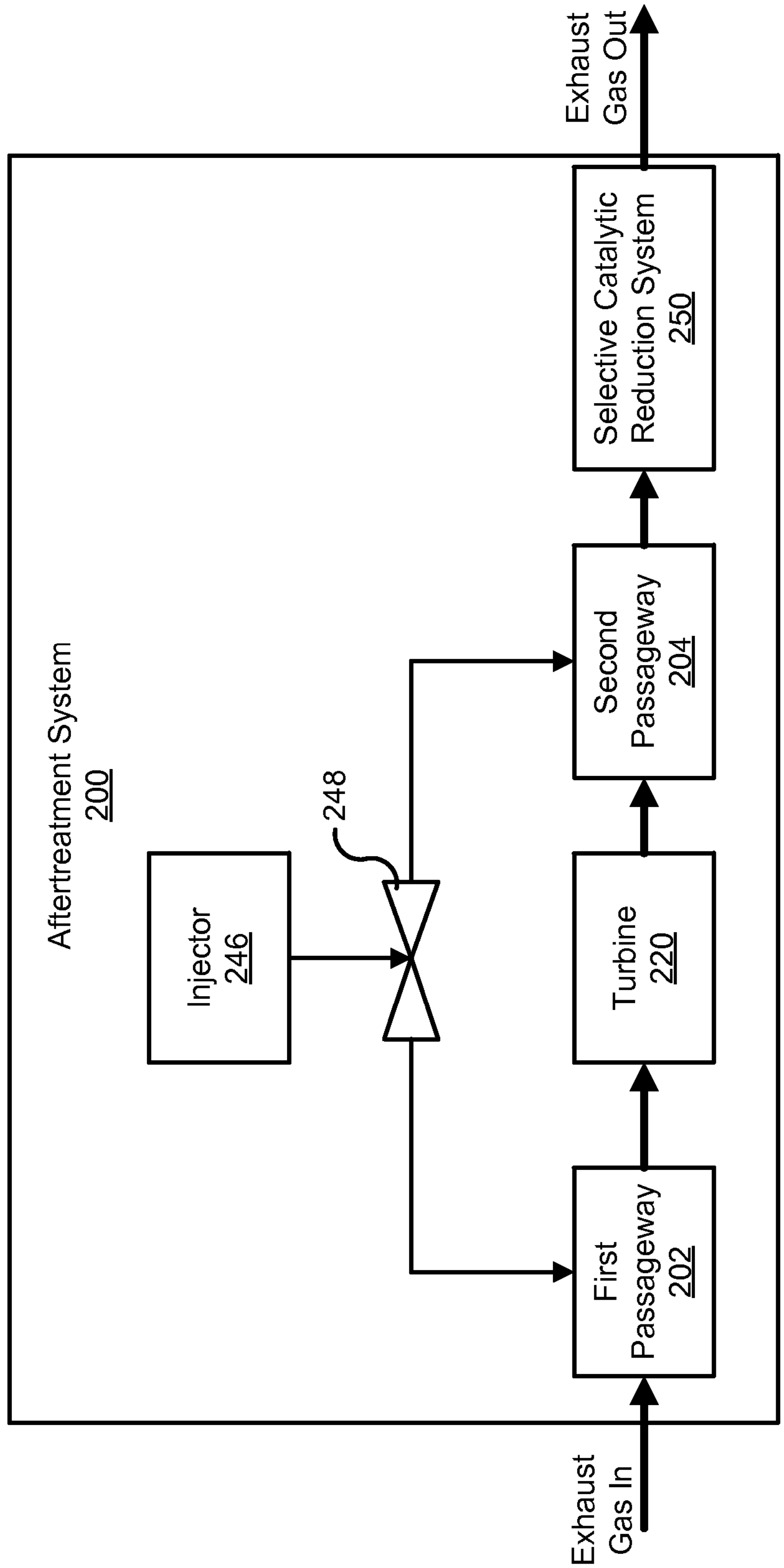
FIG. 2 is a schematic block diagram of an aftertreatment system, according to another embodiment.

In some embodiments, an aftertreatment system can be structured to allow injection of an exhaust reductant upstream or downstream of a turbine based on the temperature of exhaust gas or otherwise a temperature of the portion of the aftertreatment system upstream and downstream of the turbine. FIG. 2 shows an aftertreatment system 200 for receiving an exhaust gas (e.g., a diesel exhaust gas) and treating the exhaust gas. The aftertreatment system 200 includes a first passageway 202, a second passageway 204, a turbine 220, an injector 246, a valve 248, and a SCR system 200.

The first passageway 202 has a first temperature, and the second passageway 204 has a second temperature different than the first temperature. For example, the first temperature can be greater than the second temperature as described with respect to the aftertreatment system 100. The first passageway 202 and the second passageway 204 can be substantially similar to the first passageway 102 and the second passageway 104 included in the aftertreatment system 100 described herein, and therefore not described in further detail.

The turbine 220 is disposed downstream of the first passageway 202 and upstream of the second passageway 204, and fluidically coupled to each of the first passageway 202 and the second passageway 204. The turbine 220 is structured to receive an exhaust gas from the first passageway 202, extract energy from the exhaust gas flowing through the turbine 220 and communicate the exhaust gas to the second passageway 204.

The SCR system 250 is disposed downstream of the second passageway 204. The SCR system 250 is configured to receive the exhaust gas from the second passageway 204 and reduce the exhaust gas with the assistance of injected reductant. The SCR system 250 can be substantially similar to the SCR system 150 described herein. Furthermore, the aftertreatment system 200 can include any other components, for example, mixers, screens, diesel oxidation catalysts, diesel particulate filters, or any other components as described with respect to the system 100.

The injector 246, the turbine 220, the SCR system 250 and any other components of the aftertreatment system 200 can be fluidically coupled in any suitable configuration. In some embodiments, the SCR system 250 is be disposed upstream of the turbine but downstream of the injection or otherwise insertion location of the exhaust reductant. The aftertreatment system 200 can also include a plurality of injectors.

In particular embodiments, the aftertreatment system 200 includes a first injector (e.g., the injector 246) structured to inject or otherwise insert the exhaust reductant upstream of the turbine 220. The SCR system 250 is disposed downstream of the turbine 220. The aftertreatment system 200 can also include a second injector, a DOC, a DPF, a second SCR system, and/or an ammonia oxidation (AMOx) system fluidically coupled to each other. The DOC and/or the DPF are disposed downstream of the SCR system 250. The second SCR system and/or the AMOx are disposed downstream of the SCR system 250. Furthermore, the second injector is structured to inject or otherwise insert a second stream of exhaust reductant upstream of the second SCR system and/or the AMOx.

The injector 246 is structured to inject or otherwise insert the exhaust reductant into the first passageway 202 and/or the second passageway 204. The injector 246 can be substantially similar to the injector 146 and therefore not described in further detail herein. A valve 248 is fluidically coupled to each of the injector 246, the first passageway 202 and the second passageway 204. The valve 248 can, for example, include a three way valve configured to direct the exhaust reductant flow received from the injector 246 to any one of the first passageway 202 or the second passageway 204 based on the first temperature and the second passageway.

For example, the valve 248 can be configured to direct the exhaust reductant flow towards the first passageway 202 only when the second temperature of the second passageway 204 is below a minimum threshold. Expanding further, the aftertreatment system 200 can include sensors to sense the first temperature and the second temperature. Under certain operational parameters of the engine (e.g., at high load conditions), the exhaust gas temperature expelled from the engine can be sufficiently high such that a drop in temperature of the exhaust gas from the first temperature to the second temperature still results in the second temperature being above the minimum threshold. The minimum threshold corresponds to a temperature above which the exhaust reductant completely evaporates (e.g., 200 degrees Celsius). Under such operational parameters, the second temperature can be sufficient to minimize exhaust reductant deposits. Therefore in such conditions, the valve 248 can redirect the flow of exhaust reductant to the second passageway 204.

On the other hand, if the operational parameters are such that the second temperature is below the minimum threshold (e.g., during idling, cruising or low load conditions), the valve 248 can direct the exhaust reductant flow towards the first passageway 202. Thus the exhaust reductant will be exposed to the first temperature which is sufficient to evaporate the exhaust reductant and minimize exhaust reductant deposits.

Figure 3:
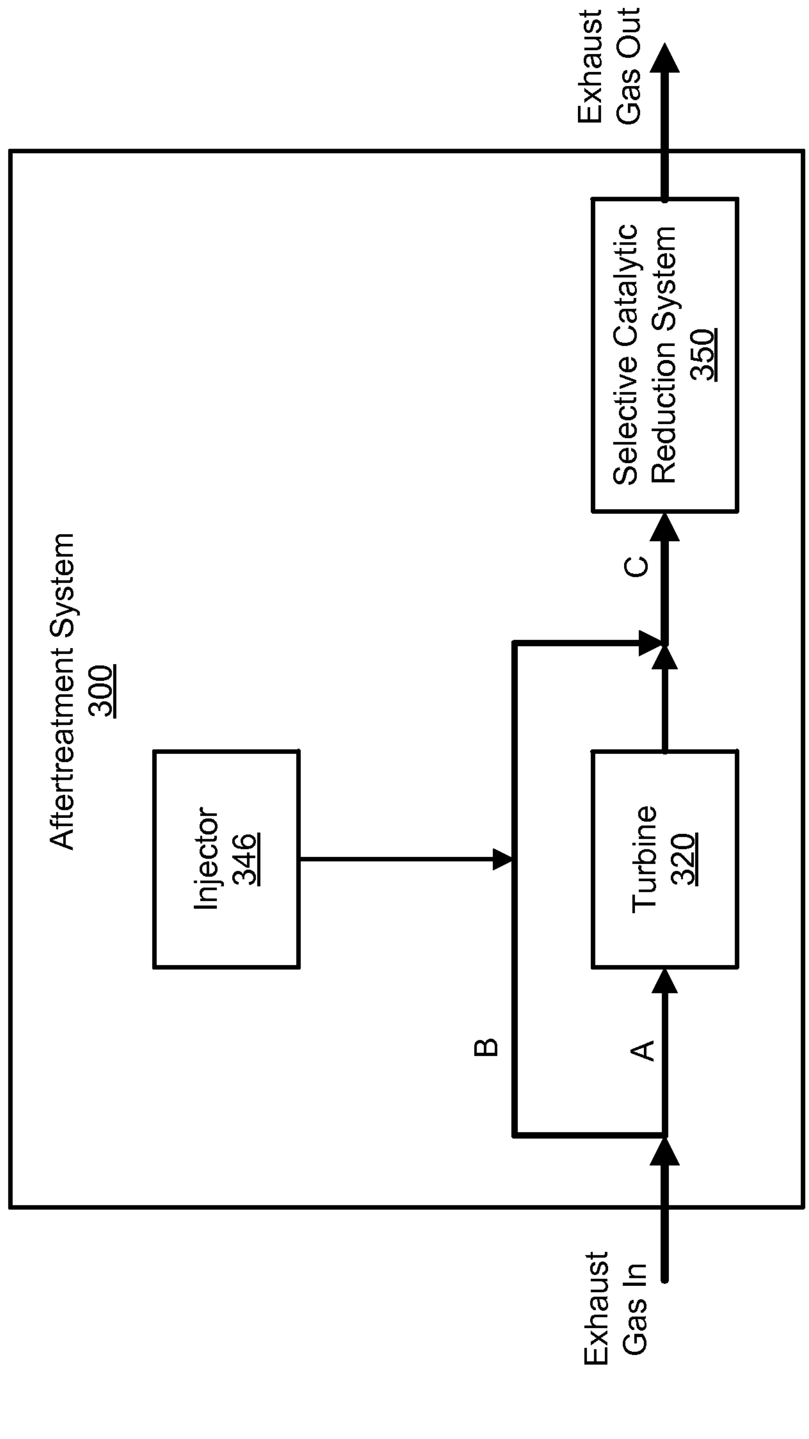
FIG. 3 is a schematic block diagram of an aftertreatment system, according to yet another embodiment.

In some embodiments, an aftertreatment system can be configured to inject or otherwise insert an exhaust reductant in only in a portion of an exhaust gas that does not flow through a turbine. FIG. 3 shows an aftertreatment system 300 that includes a turbine 320 and an SCR system 350. The aftertreatment system 300 is structured to receive an exhaust gas (e.g., a diesel exhaust gas) and treat the exhaust gas.

The system 300 includes an exhaust gas loop which includes a first branch as shown by the arrow A and a second branch shown by the arrow B. The exhaust gas received from the engine is divided into a first portion which flows through the first branch A and is communicated to the turbine 320. The first portion of the exhaust gas has a first portion first temperature. The turbine 320 can be substantially similar to the turbine 120 or 220 and therefore not described in further detail herein. The first portion of the exhaust gas flows through the turbine 320 and experiences a drop in temperature so that the first portion of the exhaust gas has a first portion second temperature downstream of the turbine 320 which is lower than the first portion first temperature.

A second portion of the exhaust gas flows through the second branch B which bypasses the turbine 320. The injector 346 injects the exhaust reductant into the exhaust gas flowing through the second branch B. Since the second portion of the exhaust gas does not flow through the turbine 320, it experiences a much lesser decrease in temperature relative to the first portion of the exhaust gas flowing through the turbine 320 so that the second portion of the exhaust gas has a second portion temperature lower than or equal to the first portion first temperature and greater than the first portion second temperature. Thus the temperature of the second portion of the exhaust gas can be sufficient to minimize exhaust reductant deposits. In this manner, the exhaust reductant deposits can be minimized due to the high temperature of the first portion of the exhaust gas without exposing to the turbine to the exhaust reductant.

The mixture of the second portion of the exhaust gas and the exhaust reductant, and the first portion of the exhaust gas flowing out of the turbine shown by the arrow C, are mixed together before entering the SCR system 350. Since the second portion of the exhaust gas remains at a higher temperature than the first portion of the exhaust gas, a temperature of the first portion of the exhaust gas can also be elevated after mixing with the second portion of the exhaust gas. In this manner, the temperature of the exhaust gas entering the SCR system 350 can be sufficient to minimize exhaust reductant deposits. In particular embodiments, the aftertreatment system 300 can also include a DOC or a DPF which can be disposed upstream of the SCR system 350 and downstream of the turbine 320.

Furthermore, dividing the exhaust gas into the first portion and the second portion can also prevent the exhaust reductant from entering an EGR loop which can be fluidically coupled to the aftertreatment system 300. For example, the exhaust gas can be divided into the first portion and the second portion using a split exhaust manifold which has the first branch A and the second branch B. The EGR loop can be in fluidic communication with the first branch A such that the EGR loop draws a portion of the exhaust gas from the first branch A which does include any exhaust reductant.

In some embodiments, the turbine 320 can include a divided exhaust manifold and a twin entry asymmetric turbine. In such embodiments, the exhaust reductant can be prevented from entering the EGR loop by injecting the exhaust gas on a first portion of the turbine 320 that does not draw the exhaust gas for the EGR loop (e.g., the lambda side of the turbine 320). A diesel oxidation catalyst can also be included in an EGR loop manifold, downstream of the EGR take-off point. The diesel oxidation catalyst can oxidize NO to $NO_2$, which can improve downstream SCR performance. Moreover, a hydrocarbon injector can be provided in the EGR loop, downstream of the EGR take-off point, to inject a hydrocarbon into the EGR loop manifold.

A mesh (e.g., the mesh 108) may be positioned upstream of the turbine 320 to prevent reductant deposits from entering the turbine. In further embodiments, in which the turbine 320 includes an asymmetric turbine, an exhaust valve can be disposed upstream of the first branch A and the second branch B. The exhaust valve can be used to control the flow of the exhaust gas and thereby, the heat provided to the aftertreatment system 300 before or after the turbine 320. The exhaust valve can also be used to regulate the heat of a diesel oxidation catalyst, for example, to regulate catalyst temperature for efficient conversion of the NOx gases. In such embodiments, the engine can be configured to have VVT exhaust flow such that the heat can be controlled via the exhaust valve.

Figure 4:
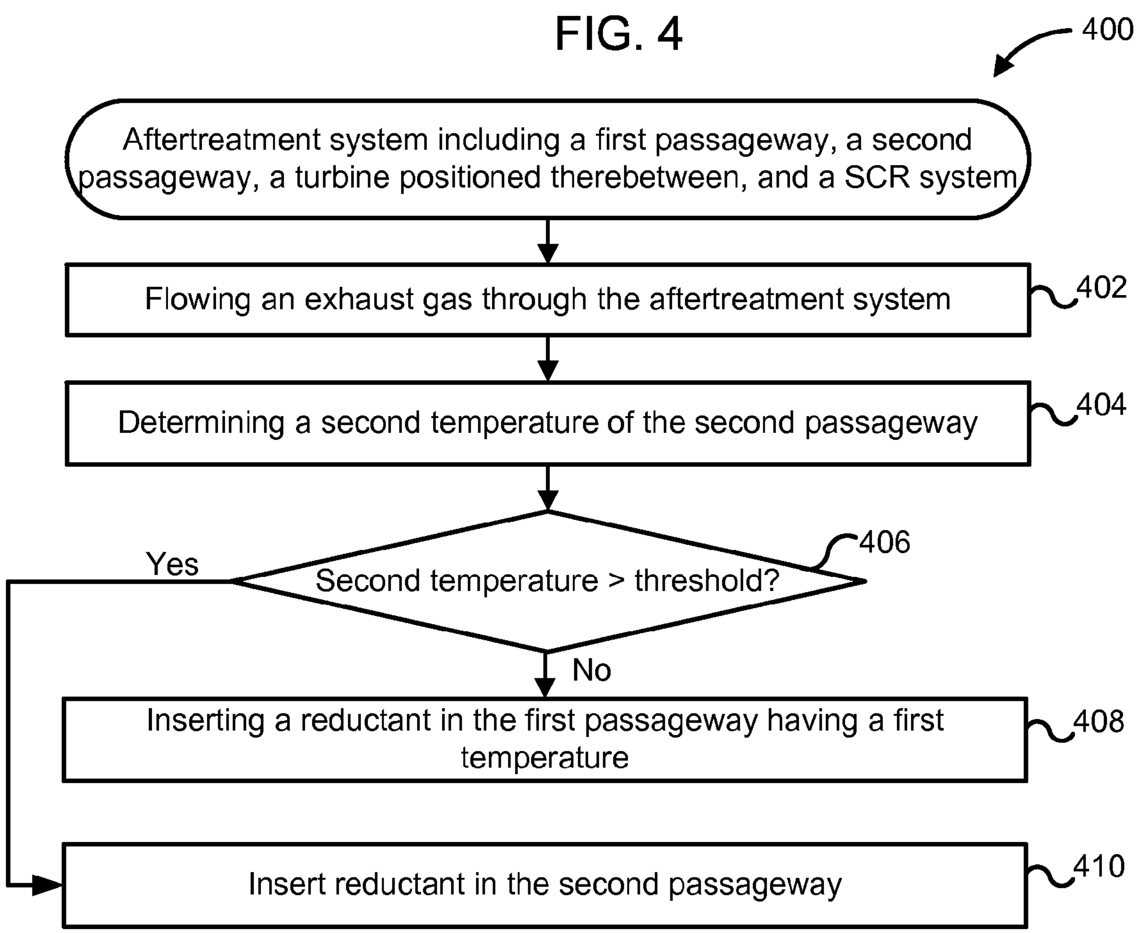
FIG. 4 is a schematic flow diagram of a method for reducing exhaust reductant deposits in an aftertreatment system.

FIG. 4 is a schematic flow diagram of an example method 400 for reducing exhaust reductant deposits in an aftertreatment system. The aftertreatment system (e.g., the aftertreatment system 100/200) includes a first passageway (e.g., the first passageway 102/202), a second passageway (e.g., the second passageway 104/204), a turbine (e.g., the turbine 120/220) positioned downstream of the first passageway and upstream of the second passageway and a SCR system (e.g., the SCR system 150, 250 or 350) positioned downstream of the second passageway.

The method 400 includes flowing an exhaust gas through the aftertreatment system at 402. For example, the aftertreatment system 100/200 can be fluidly coupled to an engine (e.g., a diesel engine, a gasoline engine, a natural gas engine, a dual-fuel engine, a biodiesel engine, etc.) for receiving an exhaust gas therefrom. The exhaust gas flows through the first passageway 102/202 through the turbine 120/220 into the second passageway 104/204 and therefrom into the SCR system 150/250. The first passageway is at a first temperature. As the exhaust gas flows through the turbine, it expands and experiences a drop in temperature so that the exhaust gas, and thereby the second passageway, have a second temperature lower than the first temperature.

The second temperature of the second passageway is determined at 404. For example, a temperature sensor can be operatively coupled to the second passageway 104/204 to determine a value of the second temperature thereof. It is determined whether the second temperature is greater than a minimum threshold at 406. For example, a controller (e.g., an electronic control unit) which includes lookup tables, equations, algorithms, etc. can compare the second temperature to the minimum threshold. The minimum threshold can correspond to a temperature at which the exhaust reductant (e.g., a diesel exhaust fluid) completely vaporizes. In particular embodiments, the minimum threshold is 200 degrees Celsius.

If the second temperature is lower than the minimum threshold, then the exhaust reductant is inserted into the first passageway at 408. For example, during certain conditions (e.g., idling, steady state or low load conditions), a temperature of the exhaust gas entering the first passageway 102/202, and thereby the first temperature of the first passageway 102/202, can be only slightly higher than the minimum threshold. As the exhaust gas passes through the turbine 120/220, the temperature thereof drops so that a temperature of the gas exiting the turbine, and thereby the second temperature, is lower than the first temperature as well as the minimum threshold. In this situation, inserting the exhaust reductant in the second passageway can lead to incomplete evaporation of the exhaust reductant inserted therein, which may lead to increase in reductant deposits in the second passageway as well as downstream thereof.

In contrast, the first temperature of the first passageway is above the minimum threshold. Therefore, inserting the exhaust reductant into the first passageway will lead to complete evaporation of the exhaust reductant thereby reducing exhaust reductant deposits. In some embodiments, the turbine (e.g., the turbine 120/220) can be coated with a corrosion resistant material to reduce corrosion thereof due to the exhaust reductant flowing therethrough. A screen or mesh (e.g., the mesh 108) can also be positioned upstream of the turbine to prevent any reductant deposits from entering the turbine. Furthermore, a mixer (e.g., the 106) may also be positioned upstream of the turbine to reduce the droplets of the exhaust reductant entering the turbine.

In some embodiments, if the second temperature of the second passageway is above the minimum threshold, the exhaust reductant is inserted into the second passageway 410. For example, once the engine producing the exhaust gas has heated up and/or during high load conditions (e.g., acceleration), the temperature of the exhaust gas entering the first passageway 102/202 may be substantially above the minimum threshold. In such instances, while the temperature of the exhaust gas will drop as the exhaust gas is communicated through the turbine 120/220, the temperature of the exhaust gas exiting the turbine 120/220, and thereby the second temperature of the second passageway 104/204, may still be higher than the minimum threshold (e.g., 200 degrees Celsius). Therefore, inserting the exhaust reductant into the second passageway 104/204 will cause substantially all of the exhaust reductant to evaporate.

In various embodiments, a valve (e.g., the valve 248) can be fluidly coupled to the first passageway (e.g., the first passageway 102/202) and the second passageway (e.g., the second passageway 104/204). The valve is structured to direct the flow of the exhaust reductant towards the first passageway or the second passageway based on the second temperature of the second passageway as described herein. In particular embodiments, the method 400 can also include operating the engine fluidly coupled to the aftertreatment system and producing the exhaust gas employing VVT. For example, VVT can be used to cause the engine to produce the exhaust gas at the first temperature which is sufficient for vaporizing the exhaust reductant.

In various embodiments, the method 400 also includes flowing the exhaust reductant through at least a portion of the engine. In such embodiments, the exhaust reductant serves as a coolant for the engine and absorbs the heat from the engine so that the exhaust reductant is heated before communicating into the first passageway (e.g., the first passageway 102/202) and/or the second passageway (e.g., the second passageway 104/204). In still other embodiments, aftertreatment system (e.g., the aftertreatment system 100/200/300) can be fluidly coupled to an EGR system. The exhaust reductant is flown through at least a portion of the EGR system so that the exhaust reductant absorbs heat from the exhaust gas flowing through the EGR system and is heated before communicating into the first passageway. The preheating can facilitate vaporization of the exhaust reductant inserted into the first passageway (e.g., the first passageway 102/202) and/or the second passageway (e.g., the second passageway 104/204).

As used herein, the singular forms “a”, “an” and “the” include plural referents unless the context clearly dictates otherwise. Thus, for example, the term “a member” is intended to mean a single member or a combination of members, “a material” is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An aftertreatment system, comprising;

a first passageway having a first temperature;

a second passageway having a second temperature different than the first temperature;

a turbine disposed downstream from the first passageway and upstream from the second passageway, the turbine in fluidic communication with the first passageway and the second passageway, the turbine structured to receive an exhaust gas from the first passageway, generate energy using the exhaust gas flowing through the turbine and communicate the exhaust gas to the second passageway;

a valve coupled to each of the first passageway and the second passageway;

an insertion device fluidly coupled to the valve and configured to communicate an exhaust reductant into the valve;

a controller operatively coupled to the valve and configured to instruct the valve to selectively direct the exhaust reductant flow towards one of the first passageway or the second passageway; and a selective catalytic reduction system configured to receive the exhaust gas from the second passageway and reduce the exhaust gas with the assistance of inserted exhaust reductant.

2. The aftertreatment system of claim 1, wherein the first temperature is greater than the second temperature.

3. The aftertreatment system of claim 1, wherein the first passageway is disposed downstream of an engine producing the exhaust gas, the engine employing variable valve timing so as to produce the exhaust gas at the first temperature, the first temperature being sufficient for vaporizing the exhaust reductant.

4. The aftertreatment system of claim 1, wherein the aftertreatment system further comprises:

a screen disposed downstream of the first passageway and upstream of the turbine, the screen structured to prevent exhaust reductant deposits from entering the turbine.

5. The aftertreatment system of claim 1, further comprising:

a mixer positioned downstream of the first passageway and upstream of the turbine, the mixer structured to reduce a size of droplets of the exhaust reductant entering the turbine.

6. The aftertreatment system of claim 1, wherein the aftertreatment system further comprises:

a temperature sensor coupled to the second passageway and configured to measure the second temperature of the second passageway, wherein, the controller is also operatively coupled to the temperature sensor, the controller configured to instruct the valve to direct the exhaust reductant flow towards the first passageway when the second temperature of the second passageway is below a minimum threshold.

7. The aftertreatment system of claim 1, wherein the insertion device includes an injector structured to inject the exhaust reductant into the valve.

8. The aftertreatment system of claim 1, wherein the turbine is coated with a corrosion resistant coating.

9. The aftertreatment system of claim 1, wherein the aftertreatment system is fluidly coupled to an engine producing the exhaust gas, and wherein the exhaust reductant is used as a coolant for the engine, the exhaust reductant absorbing heat from the engine so that the exhaust reductant is heated before communicating into the first passageway.

10. The aftertreatment system of claim 1, wherein the aftertreatment system is fluidly coupled to an exhaust gas recirculation system, and wherein the exhaust reductant is used as a coolant for the exhaust gas recirculation system, the exhaust reductant absorbing heat from the exhaust gas before communicating into the first passageway.

* * * * *